United States Patent [19]

Miihkinen

[11] Patent Number: 4,796,342
[45] Date of Patent: Jan. 10, 1989

[54] PRESS ROLL FOR PAPER MAKING MACHINES

[75] Inventor: Veijo Miihkinen, Jyväskylä, Finland

[73] Assignee: Valmet Oy, Finland

[21] Appl. No.: 85,933

[22] Filed: Aug. 17, 1987

Related U.S. Application Data

[63] Continuation-in-part of Ser. No. 894,925, Aug. 8, 1986, Pat. No. 4,748,736, which is a continuation-in-part of Ser. No. 816,628, Jan. 6, 1986.

[30] Foreign Application Priority Data

Sep. 16, 1985 [FI] Finland ................................ 853544

[51] Int. Cl.$^4$ ............................................. B21B 27/00
[52] U.S. Cl. ......................................... 29/132; 29/130
[58] Field of Search ............. 29/132, 130; 100/155 R; 162/358

[56] References Cited

U.S. PATENT DOCUMENTS

| | | | |
|---|---|---|---|
| 2,114,072 | 4/1938 | Cleveland | 92/49 |
| 3,974,555 | 8/1976 | Strohmeier et al. | 29/132 |
| 4,069,570 | 1/1978 | Pospisil et al. | 29/132 |
| 4,316,769 | 2/1982 | Dahl | 162/360 R |
| 4,433,032 | 2/1984 | Nakamura et al. | 29/132 |
| 4,484,959 | 11/1984 | Boncher et al. | 29/132 |
| 4,507,366 | 3/1985 | Werquin et al. | 29/132 |
| 4,548,653 | 10/1985 | Bocquet et al. | 29/132 |
| 4,552,620 | 11/1985 | Adams | 162/358 |
| 4,609,577 | 9/1986 | Long | 29/132 |
| 4,704,776 | 11/1987 | Watanabe et al. | 29/132 |

Primary Examiner—Timothy V. Eley
Assistant Examiner—Irene Cuda
Attorney, Agent, or Firm—Steinberg & Raskin

[57] ABSTRACT

A press roll for a paper machine suitable for use as a substitute for a granite roll includes an inner roll body having a metallic cylindrical exterior to which a coating is applied formed either only of a metallic component or of a mixture of metallic and ceramic components. Where the coating material includes only a metallic component, such a metallic component is chosen so that a separate ceramic component precipitates during the alloying of the material. The coating material is formulated to obtain a surface energy and polarity component thereof which provide the roll surface with suitable web release properties for particular pulp qualities.

20 Claims, 3 Drawing Sheets

RELEASE ANGLE VS. SPEED DIFFERENCE

□ GRANITE ROLL
▨ EXPERIMENTAL ROLL

PRESS ROLL FOR PAPER MAKING MACHINES

This application is a continuation-in-part of application Ser. No. 894,925 filed Aug. 8, 1986 now U.S. Pat. No. 4,748,736 which is a continuation-in-part of application Ser. No. 816,628 filed Jan. 6, 1986.

BACKGROUND OF THE INVENTION

The present invention relates generally to press rolls for use in paper making machines and, more particularly, to press rolls useful as substitutes for granite rolls in paper making machines.

Stone rolls, often used in the center roll position of paper machine press sections, are usually formed of granite since a granite surface has generally acceptable web release properties and, additionally, is relatively resistant to the abrasive effects of a doctor.

However, granite press rolls have drawbacks resulting from other properties of granite. Granite is a non-homogeneous, brittle material having internal flaws inherent in its structure. Further, the properties of granite vary with heating and cooling cycles. This, in conjunction with the anisotropic properties of granite, can cause a number of problems which must be taken into account both in the manufacture and use of the rolls. For example, special grinding techniques at elevated temperatures have been used to improve the quality of granite rolls.

The fact that internal flaws exist in granite has limited the linear loads to which granite rolls can be subjected thereby limiting the extent to which a web can be dewatered in the paper machine press section. Although sophisticated designs, such as the use of tensioning flanges attached at the ends of a steel shaft passing through the thick cylindrical granite mantle for eliminating the possibility of tensile loads acting on the mantle under any loading conditions, have reduced the susceptibility of granite rolls to catastrophic failure, occasional cracking has occurred with consequent expensive down time required for repairs or replacement of the roll. Another disadvantage of granite rolls is their great weight which necessitates extensive frame constructions and which increase the tendency for the paper machine to vibrate during operation.

Attempts have been made for these reasons to provide synthetic substitutes for granite rolls. For example, rolls have been provided with coverings formed of a polymer, such as hard rubber or polyurethane, to which a rock powder, such as quartz sand, has been added. However, such synthetic rolls have the drawback that the paper web has a tendency to adhere excessively to the roll surface. Moreover, such rolls have poor strength properties and cannot be used at elevated temperatures, such as above 80° C.

SUMMARY OF THE INVENTION

It is an object of the present invention to provide new and improved press rolls for paper machines.

Another object of the present invention is to provide new and improved press rolls for paper machines which can be used in place of granite rolls but which are not subject to the disadvantages of granite rolls described above.

Still another object of the present invention is to provide new and improved press rolls of the type described above which can be constructed from conventionally manufactured roll bodies which provide mechanical strength for the roll.

A further object of the present invention is to provide new and improved press rolls for paper machines having web release surface properties suited for particular pulp qualities and which, additionally, are highly resistant to strains caused by temperature variations.

The invention is based on the recognition that the release characteristics of a press roll depend upon the surface energy of the press roll which in turn is a factor of both the material of which the surface is formed as well as the relative proportions of hydrophilic and hydrophobic components in the surface material. The surface energy of the roll must be within certain limits in order to control the detachment or release of the web from the surface of the press roll. For example, granite will provide generally acceptable web detachment or release characteristics when its surface energy, which varies as a function of the roughness of the granite surface, is in the range of between about 41 to 50 mJ/m$^2$.

Additionally, the hydrophilic/hydrophobic characteristics or behavior of the roll surface also affects the web release characteristics of a press roll. Since hydrophilic substances repel hydrophobic substances and vice versa, and since a paper web contains hydrophilic and hydrophobic groups, the release charactertics of a roll surface material will also depend on the ratio of hydrophilic to hydrophobic components contained therein. Different paper grades contain different respective proportions of hydrophilic and hydrophobic substances characterized by the particular pulp quality. For example, release problems have been found to exist in the case of a granite press roll and unbleached kraft, such as sack paper, indicating that a roll material is needed that behaves more hydrophilically than granite.

Accordingly, it is believed that various paper grades should possess preferred matching roll materials with particular hydrophilic and hydrophobic compositions and surface energies that yield advantageous sheet release properties for that particular paper grade.

Briefly, a press roll is provided including a roll body or mantle having a metallic exterior and manufactured by conventional techniques, and a coating applied to the exterior of the roll body to form the outer surface of the press roll. According to the invention, the coating is formed of a material comprising either a metallic component only or a mixture of a metallic component and a non-metallic, ceramic component. The compositions of the metallic and ceramic, if any, components are formulated to provide the coating with a surface energy and hydrophilic/hydrophobic characteristics (measured by the polarity component of the surface energy) which will yield advantageous sheet release properties for a particular paper grade. The surface energy is generally within the range of between about 35 to 50 mJ/m$^2$. A material having a polarity component lower than 7.1 mJ/m$^2$. A material having a polarity component lower than 7.1 mJ/m$^2$ behaves more hydrophobically than granite. More hydrophilic coating materials provide advantageous release properites for unbleached pulps whereas coating materials which behave hydrophobically produce advantageous release properties for newsprint pulps.

In the case where the coating material comprises only a metallic component, it is formulated so that a separate ceramic component precipitates in the coating process during which the material is alloyed to provide corrosion and wear resistance. For example, the roll body may be coated by applying a mixture of materials in the form of a band over the roll body exterior and using an arc welding technique which alloys the material with a separate ceramic component precipitating during the welding process. Where the ceramic component is not provided as a result of the alloying of the metallic component, the coating can be provided, for example, by preparing an admixture band from a powder comprising a mixture of metallic and ceramic materials by rolling and sintering or the desired ceramic component can be provided in a shield powder used to alloy the welded surface material while in a molten state. Suitable ceramic materials include, for example, $Al_2O_3$, $SiO_2$, $TiO_2$, $ZrO_2$, $SiC$, $TiC$, $Cr_3C_2$, $WC$, $NbC$, $VC$, and $Cr_7C_3$. Thus, the coating applied to the roll body in any event includes a separate component of ceramic material so that not only is the desired surface energy and hydrophilic/hydrophobic behavior achieved to provide a controlled release of the web from the roll, but, additionally, desirable corrosion resistance and wear resistance properties are obtained.

The metallic component generally has a composition comprising a base metal and a relatively large proportion, e.g., between about 9 to 35 percent, of chromium. The use of chromium is advantageous in that chromium is a hydrophilic material and the addition of chromium increases the surface energy of the metal as well as its polarity component.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
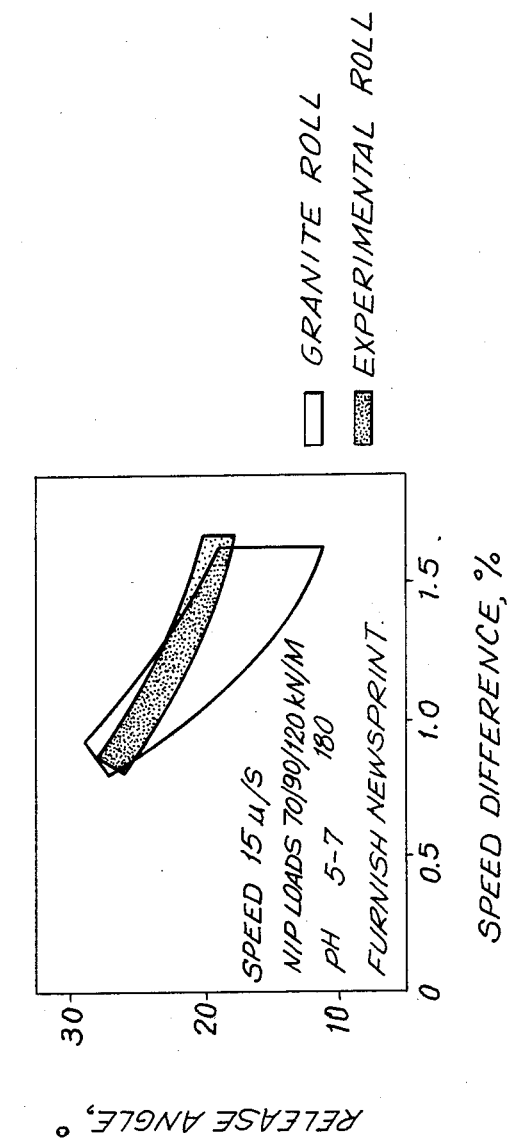
FIG. 1 is a graphical illustration showing the sheet release behavior of a roll coating according to the invention compared to the sheet release behavior of a granite roll.

In accordance with the invention, a coating of a material having the desired properties is applied to a roll body or mantle having a metallic exterior. The roll body or mantle is manufactured in conventional manner such, for example, as by casting, or alternatively, by forming the same from a metal sheet or sheets formed in a cylindrical shape with abutting end edges welded to each other. The roll body or mantle, including the ends and axle journals, provide the roll with necessary mechanical strength. Generally, the coating is formed from a material comprising either only a metallic component, in which case a separate ceramic component precipitates during the application of the material onto the roll body, or a mixture of a metallic component and a ceramic component. The metallic component is formulated to have a surface energy and a polarity component thereof which yield the desired sheet release properties while the ceramic component provides the roll surface with good resistance to wear and corrosion.

Preferred metallic components for a roll coating in accordance with the invention are materials alloyed with relatively large quantities of chromium, e.g., wherein the proportion of chromium in the metallic component is in the range of between about 9 to 35 percent. Chromium is a hydrophilic material and the addition of increasing amounts of chromium to the metallic component increases the surface energy and its polarity component. A particularly advantageous metallic component comprises stainless steel containing chromium in proportions ranging from about 9 percent to about 35 percent. Stainless steel containing chromium in the higher end of this range is a hydrophilic substance whereas stainless steel containing chromium in the lower end of the range exhibits hydrophobic behavior. By adjusting the amount of chromium, the surface energy and polarity component of the coating can be controlled in accordance with the web release properties suitable for a particular pulp quality. Additionally, wear and corrosion resistant chromium carbides are formed during the alloying of the stainless steel metallic component. The formation of a separate ceramic component during alloying makes it unnecessary to add a separate ceramic material.

EXAMPLE 1

An experimental roll having a diameter of 1220 mm and a length of 1150 mm was provided with a stainless steel coating having the following composition (&):

| C | Si | Mn | P | S | Cr | Ni | Mo |
|---|---|---|---|---|---|---|---|
| 0.19 | 0.55 | 0.17 | 0.035 | 0.010 | 13.15 | 0.15 | 0.01 |

The chemical composition of the coating was selected in order to achieve, owing to the chromium content, adequate wear resistance and corrosion resistance (though the precipitation of chromuim carbide during the alloying) and a surface energy and polarity component particularly suited for newsprint pulps. Optimum web release for newsprint pulps is obtained by coating materials which are slightly more hydrophobic than granite. The surface energy of the coating of Example 1 is 39.3 $mJ/m^2$ and its polarity component is 7.1 $mJ/m^2$ which is at a lower limit as compared with granite, i.e., the coating is slightly more hydrophobic than granite.

Referring to FIG. 1, the release properties for newsprint furnish of the experimental roll provided with the coating having the components of Example 1 are illustrated compared to those of a conventional granite roll.

The vertical axis represents the release angle in degrees and the horizontal axis represents the web release speed difference in percent. The speed of the roll surface was 15 m/s. Other details of the procedure appear in FIG. 1. It is noted from FIG. 1 that the coating of Example 1 is less sensitive to process changes than granite as evidenced by the narrower scatter band. It is also noted from FIG. 1 that the slope of the release curve is steeper for the granite roll than for the press roll provided with the coating of Example 1. This indicates that any change in web tension will cause a larger fluctuation of the release angle in the case of the granite roll than in the case of the press roll of the invention. Consequently, sheet flutter is reduced and runnability is improved in the case of the roll of the invention.

Figure 2:
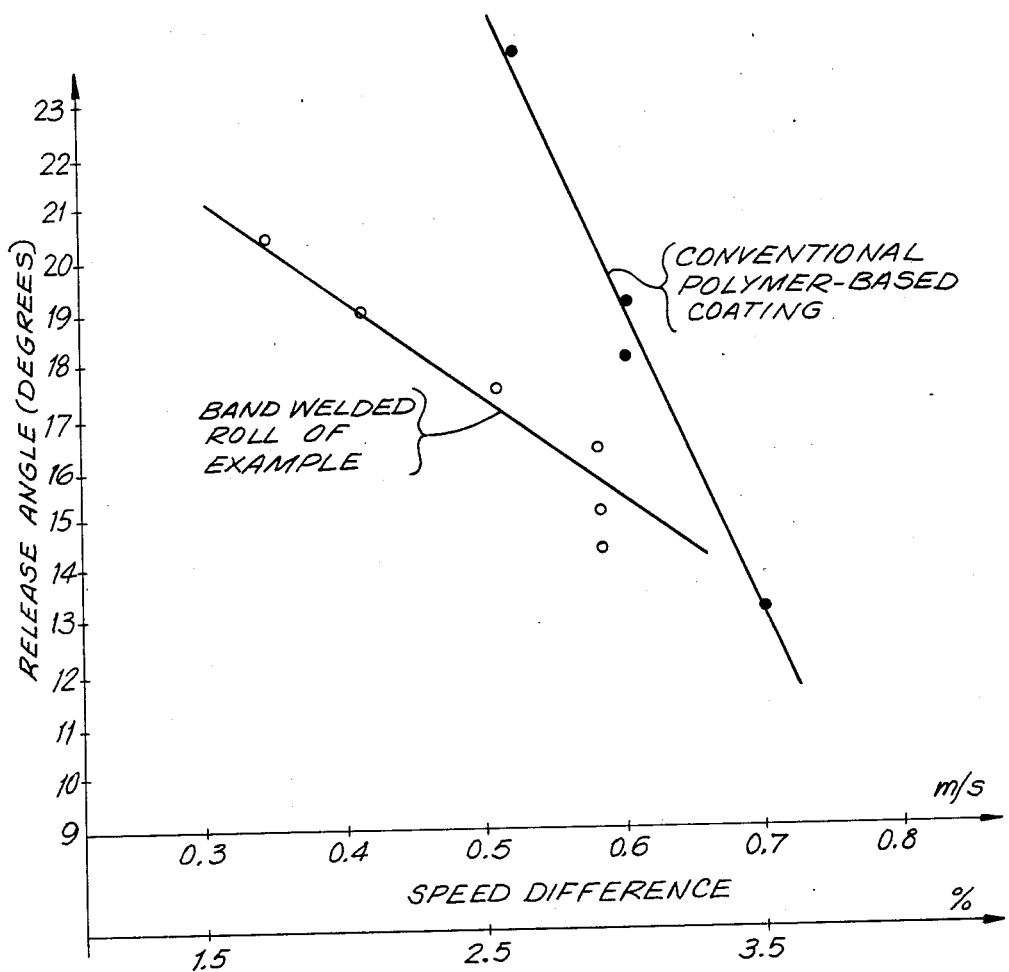
FIG. 2 is a graphical illustration showing the sheet release behavior of the roll coating whose properties are illustrated in FIG. 1 compared to the sheet release behavior of a polymer covered roll.

Referring to FIG. 2, the release properties for newsprint pulp of the coating material of Example 1 are illustrated compared to those of a conventional polymer-based coating. The vertical axis represents the release angle in degrees and the horizontal axis represents the web release speed difference in meters per second and in percent, the speed of the roll surface being 20 m/s. The speed difference is the difference between the speed of the web being released from the roll surface and the speed of the roll surface. Other details of the process appear in FIG. 2.

After one year of experimental operation, no wear or corrosion in the surface of the press roll of the invention could be discerned. The roll exhibited excellent resistance to mechanical and thermal damage, is light weight and the hardness of coating is 500HV.

The invention is of course not limited to this composition. For example variations in the chromium content will vary the surface energy, polarity component, hardenability, and carbide precipitation.

EXAMPLE 2

Another alloy was formulated which was more hydrophobic than the alloy of Example 1 so as to exhibit release characteristics suitable for newsprint pulps. The composition (&) of the alloy was as follows:

| Cr | W | C | Co |
|----|---|---|----|
| 26 | 5 | 1 | balance |

The surface energy of this cobalt-based alloy is 36.5 mJ/m$^2$ and the polarity component is 3.5 mJ/m$^2$. Thus, a coating formed of this alloy provides web release characteristics suitable for newsprint pulps. A separate carbide component of the coating precipitates during the alloying of the coating material.

EXAMPLE 3

An alloy was formulated with a view toward providing a coating material which exhibits advantageous release behavior for unbleached paper pulp, i.e., which is more hydrophilic than granite. In this connection, unbleached paper pulp has large contact angles with granite indicative of the fact that such pulps require a coating that behaves more hydrophilically than granite. The composition (&) of the coating was as follows:

| Cr | W | C | Mo | Fe | Ni |
|----|---|---|----|----|----|
| 17 | 7 | 0.1 | 17 | 6 | Balance |

The surface energy of this nickel-based composition alloyed mainly with chromium and molybdenum is 45.5 mJ/m$^2$ and the surface energy polarity is 13.7 mJ/m$^2$, i.e., more hydrophilic and therefore suitable, for example, for unbleached paper pulp.

EXAMPLE 4

Coatings comprising different mixtures of the same metal and ceramic components were applied to the roll body by plasma spraying in order to vary the surface energy of the coating substantially over a desired range. The compositions of the metal and ceramic components are shown below along with the surface energy and polarity component corresponding to each of the four different mixtures of the metal and ceramic components:

| A<br>87% Al$_2$O$_3$, 13% TiO$_2$<br>Particle Size<br>5-45 μm (%) | B<br>10% Al, 90% Cu<br>Particle Size<br>45-106 μm (%) | Surface<br>Energy<br>m J/m$^2$ | Polarity<br>Component<br>m J/m$^2$ |
|---|---|---|---|
| 0 | 100 | 39.1-40.7 | 5.5-7.6 |
| 20 | 80 | 39.5-41.1 | 6.0-8.3 |
| 50 | 50 | 42.6-46.6 | 9.9-14.5 |
| 80 | 20 | 47.1-47.6 | 15.4-16.1 |

Figure 3:
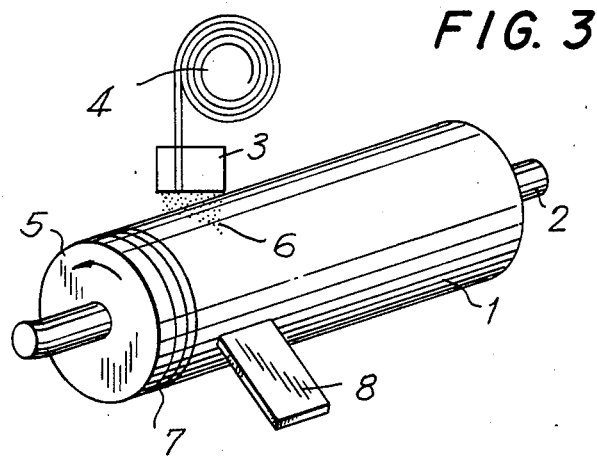
FIG. 3 is a schematic illustration showing a method of providing a roll body with a coating in accordance with the invention.

A schematic illustration of the application of a coating in accordance with the invention to a roll body using a band welding technique is shown in FIG. 3. The roll body includes a cylindrical mantle 1 formed of metallic material and axle journals 2 at its ends. A welding band formed partially or entirely or a metallic component is supplied by a welding head 3 onto the surface of mantle 1 and the roll rotates in the direction of arrow 5. The welding band 4 is supplied at a speed that is greater than the rate at which the band is welded onto the surface of the mantle 1.

The band 4 is melted in a shield powder arc, designated 6, so that a coating 7 is thereby applied to the surface of mantle 1. The surface of mantle 1 may be pre-heated by means of a blower 8 prior to coating.

In order to increase the resistance of the coating to mechanical strains and to improve the resistance of the coating to corrosion, a ceramic component may be added to shield powder 6 whereupon the shield powder 6 becomes alloyed with the molten material of the band 4. Alternatively, a ceramic material may be included in the coating by preparing the admixture band 4 to include both metallic as well as ceramic components.

Figure 4:
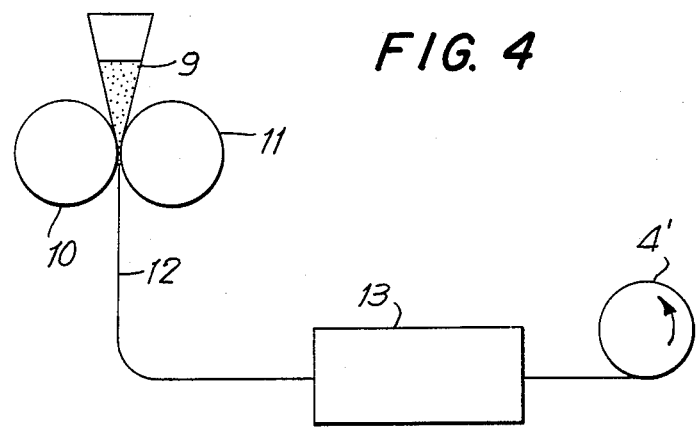
FIG. 4 is schematic illustration showing the preparation of an admixture band for use in manufacturing a coated press roll in accordance with the invention.

Referring to FIG. 4, the preparation of an admixture band 4' that contains both metallic and ceramic components is illustrated. A powder 9 comprising a mixture of the metallic and ceramic components is supplied at a suitable rate between two rolls 10 and 11 which compress the powder 9. For example, the powder 9 may comprise a mixture of chromium-containing stainless steel and a ceramic material such, for example, as one of Al$_2$O$_3$, SiO$_2$, TiO$_2$, ZrO$_2$, SiC, TiC, Cr$_3$C$_2$, WC, NbC, VC, and Cr$_7$C$_3$.

The compressed powder 12 is then sintered at 13 to form the admixture band 4' which is reeled into a roll. Alternatively, the ceramic material may be separated from the metallic component itself, such as where chromium-alloyed stainless steel is used with chromium carbide being produced without the need for separately adding the ceramic material.

The band welding technique of the invention provides important advantages, such, for example, as a high coating speed, uniform penetration to only a relatively small extent, improved reproducibility and workability, and simple construction for the manufacturing equipment. Moreover, the method is suitable for coating in a workshop, is economical, provides good joint strength between the coating and the surface of the cylindrical mantle and requires relatively small investments for tooling up.

Obviously, numerous modifications and variations of the present invention are possible in light of the above teachings. It is therefore to be understood that within the scope of the claims appended hereto, the invention may be practiced otherwise than as specifically disclosed herein.

What is claimed is:

1. A press roll for paper machines, comprising:
   a roll body having a cylindrical exterior formed of metallic material; and
   a coating applied over said roll body exterior formed of a material including a mixture of a metallic component and a ceramic component, said coating material having a surface energy within the range of between about 35 to 50 mJ/m$^2$,
   whereby said press roll has generally acceptable web release properties for paper pulp.

2. The combination of claim 1 wherein said coating material is more hydrophobic than granite material, said coating having advantageous release properties for pulps containing hydrophilic substances.

3. The combination of claim 2, wherein said coating material has a polarity component lower than about 7.1 mJ/m$^2$.

4. The combination of claim 1 wherein said coating material is more hydrophilic than granite material, said coating providing advantageous release properties for pulps containing hydrophobic substances.

5. The combination of claim 4, wherein said coating material has a polarity component greater than about 7.1 mJ/m$^2$.

6. The combination of claim 1 wherein said metallic component of said roll coating comprises a base metal and chromium alloy, wherein said alloy contains between about 9 to 35 percent chromium.

7. The combination of claim 6 wherein said metallic component of said roll coating comprises stainless steel.

8. The combination of claim 1 wherein said ceramic component comprises at least one of $Al_2O_3$, $SiO_2$, $TiO_2$, $ZrO_2$, $SiC$, $TiC$, $Cr_3C_2$, $WC$, $NbC$, $VC$, and $Cr_7C_3$.

9. The combination of claim 1 wherein said coating material comprises a metallic component comprising stainless steel having a composition including carbon, silicon, manganese, phosphorous, sulfur, nickel, molybdenum and chromium, the amount of chromium being present in the range of between about 9 to 35 percent.

10. The combination of claim 9, wherein the amount of chromium is about 13.15%.

11. The combination of claim 1 wherein said coating material comprises a metallic component comprising a cobalt based alloy having a composition including carbon, tungsten and chromium, the amount of chromium being in the range of between about 9 to 35 percent.

12. The combination of claim 11 wherein the amount of chromium is about 26 percent.

13. The combination of claim 1 wherein said coating material comprises a metallic component comprising a nickel based alloy mainly including chromium and molybdenum.

14. The combination of claim 13, wherein the amount of chromium is about 17 percent.

15. The combination of claim 1, wherein said coating material has a polarity component of about 7.1 mJ/m$^2$.

16. The combination of claim 1, wherein said ceramic component comprises a mixture of $Al_2O_3$ and $TiO_2$.

17. The combination of claim 1, wherein said metallic component includes a mixture of at least two of the following elements: Al, Cu, Ni, Cr, Co.

18. The combination of claim 1, wherein said metallic component includes a mixture of Al and Cu.

19. The combination of claim 1, wherein said metallic component comprises at least about 20% of total surface area of said coating.

20. A press roll for paper machines, comprising;
    a roll body having a cylindrical exterior formed of metallic material; and
    a coating applied over said roll body exterior formed of a material including a mixture of a metallic component and a ceramic component, said coating material having a surface energy within the range of between about 35 to 50 mJ/m$^2$.
    wherein said metallic component comprises a mixture of aluminum and copper, and said ceramic component comprises a mixture of $Al_2O_3$ and $TiO_2$.
    whereby said press roll has generally acceptable web release properties for paper pulp.

* * * * *